(12) United States Patent
Lee

(10) Patent No.: US 8,711,179 B2
(45) Date of Patent: Apr. 29, 2014

(54) MOBILE TERMINAL AND METHOD FOR DISPLAYING INFORMATION

(75) Inventor: Jeong Eun Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 558 days.

(21) Appl. No.: 13/006,056

(22) Filed: Jan. 13, 2011

(65) Prior Publication Data

US 2011/0187709 A1 Aug. 4, 2011

(30) Foreign Application Priority Data

Jan. 29, 2010 (KR) ........................ 10-2010-0008824

(51) Int. Cl.
*G09G 5/00* (2006.01)
*G06T 15/00* (2011.01)
*G06F 3/048* (2013.01)

(52) U.S. Cl.
USPC ........... 345/649; 345/419; 345/650; 345/653; 345/473; 715/764; 715/810

(58) Field of Classification Search
CPC ......... G06T 11/60; G06T 17/20; G06T 19/00; G09G 2340/0492; G06F 3/0481; G06F 3/0482; G06F 9/4443
USPC ................. 345/419, 619, 652–653, 418, 642, 345/648–650, 659, 473–474, 158, 173, 520, 345/522, 531; 715/700, 836, 744, 745, 764, 715/771, 810, 811, 835, 841, 848, 715/850–852; 382/154, 293, 296
See application file for complete search history.

(56) References Cited

U.S. PATENT DOCUMENTS

| | | | | |
|---|---|---|---|---|
| 7,543,245 | B2 * | 6/2009 | Irimajiri | 715/836 |
| 8,452,435 | B1 * | 5/2013 | Vieilly et al. | 700/98 |
| 2008/0074399 | A1 * | 3/2008 | Lee | 345/173 |
| 2008/0161059 | A1 * | 7/2008 | Kraft et al. | 455/566 |
| 2010/0064259 | A1 * | 3/2010 | Alexanderovitc et al. | 715/852 |
| 2011/0119629 | A1 * | 5/2011 | Huotari et al. | 715/836 |

FOREIGN PATENT DOCUMENTS

| | | |
|---|---|---|
| JP | 2002-175139 | 6/2002 |
| KR | 10-2004-0039507 | 5/2004 |
| KR | 10-2006-0093990 | 8/2006 |
| KR | 100860034 | 9/2008 |
| KR | 10-2009-0076648 | 7/2009 |

* cited by examiner

*Primary Examiner* — Wesner Sajous
*Assistant Examiner* — Jed-Justin Imperial
(74) *Attorney, Agent, or Firm* — H.C. Park & Associates, PLC

(57) ABSTRACT

A mobile terminal to display information includes a memory unit to store menu information and application information corresponding to a menu; a display unit that includes a touch panel and displays a first item contained in the menu information or the application information corresponding to the menu; and a control unit that rotates a touched display area of the first item and displays a second item contained in the menu information or the application information corresponding to the menu. The menu may include a main menu, one or more sub-menus, and one or more items, which may be executable applications. The first item may be an entry in a contact list, a status item representing recent call or message activity, or a multimedia item.

21 Claims, 6 Drawing Sheets

MOBILE TERMINAL AND METHOD FOR DISPLAYING INFORMATION

CROSS-REFERENCE TO RELATED APPLICATION

This application claims priority from and the benefit of Korean Patent Application No. 10-2010-0008824, filed on Jan. 29, 2010, which is hereby incorporated by reference for all purposes as if fully set forth herein.

BACKGROUND

1. Field of the Invention

Exemplary embodiments of the present invention relate to a mobile terminal and a method for displaying information, and more particularly, to a mobile terminal and a method for displaying information in which detail information is displayed or executed according to the rotation of a display area.

2. Discussion of the Background

Mobile terminals have been developed as media devices for providing not only general voice communications but also various services such as game, message transmission/reception, Internet search, wireless data communication, electronic note, digital camera and video telephony.

Recently, attempts have been made to enhance users' convenience by introducing a factor such as a graphic user interface (GUI) similar to a personal computer (PC) or a touch panel in a mobile terminal.

A mobile terminal having a touch function may include a touch panel as a user interface device in place of a keypad, to be used as an input device with a display panel to display images. In the touch panel, a voltage or current signal is generated at a position on a touch pad, touched by a touch pen, finger or the like, thereby inputting an instruction specified by a user to the touch panel. Such a touch panel enables a user to input information through a pen or finger.

However, since the touch panel simply substitutes for the functions of the keypad in the mobile terminal, various schemes for improving user convenience may be developed.

SUMMARY OF THE INVENTION

Exemplary embodiments of the present invention provide a mobile terminal to display information, in which detail information is displayed or executed according to the rotation of a display area.

Exemplary embodiments of the present invention also provide a method for displaying information using a mobile terminal, in which detail information is displayed or executed according to the rotation of a display area.

Additional features of the invention will be set forth in the description which follows, and in part will be apparent from the description, or may be learned by practice of the invention.

Exemplary embodiments of the invention disclose a mobile terminal including: a memory unit to store menu information and application information corresponding to a first menu; a display unit that includes a touch panel and displays a first item contained in the menu information or the application information corresponding to the first menu in the memory unit; and a control unit to rotate a display area of the first item and to control the display unit to display a second item contained in the menu information or the application information corresponding to the first menu in the memory unit.

Exemplary embodiments of the invention disclose a method for displaying information, the method including: storing menu information and application information corresponding to a first menu; displaying on a display unit a first item contained in the menu information or the application information corresponding to the first menu; receiving a user signal; and rotating a display area of the first item and controlling a second item contained in the menu information or the application information corresponding to the first menu to be displayed at the display area or executed based on the inputted user signal.

Exemplary embodiments of the invention disclose a mobile terminal including: a memory unit to store first menu information corresponding to a first menu and second menu information corresponding to a second menu; a display unit comprising a touch panel, the display unit to display a first item contained in the first menu information corresponding to the first menu; and a control unit to rotate a display area of the first item and to control the display unit to display a second item. The second item is contained in the first menu information or the second menu information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
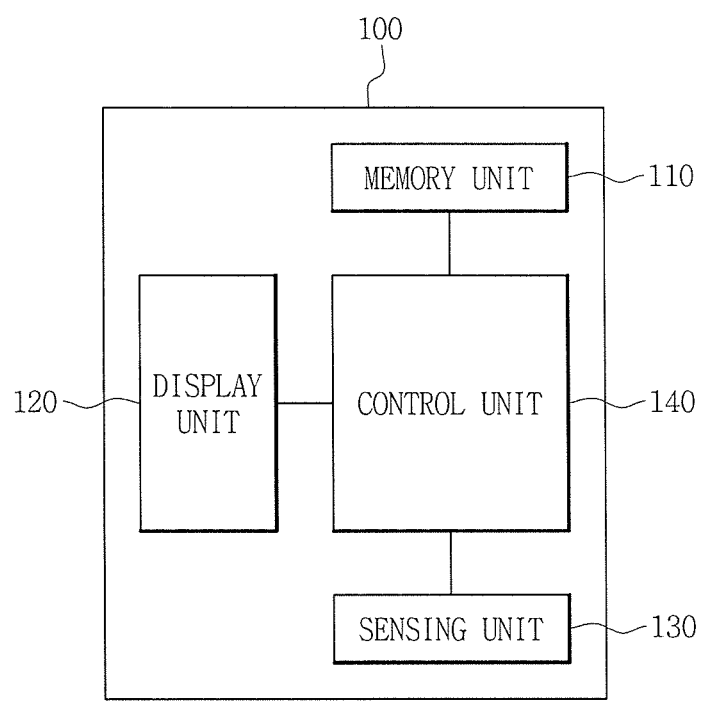
FIG. 1 is a configuration view of a mobile terminal according to an exemplary embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments. In the drawings, the size and relative sizes of layers and regions may be exaggerated for clarity. Like reference numerals in the drawings denote like elements.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a configuration view of a mobile terminal according to an exemplary embodiment.

Referring to FIG. 1, the mobile terminal 100 includes a memory unit 110, a display unit 120, a sensing unit 130, and a control unit 140.

The memory unit 110 stores menu information and information on an application corresponding to one or more menus. The menu information may include information on a main menu, a sub-menu, and an item, including a relationship there between. Each of the main menu, the sub-menu and the item may refer to a category name obtained by classifying the menu information for each category. One or more sub-menus may be included in one main menu, and one or more items may be included in one sub-menu. These relationships may be included in the menu information. The memory unit 110 may be or may include one or more types of storage medium, including a flash memory type, a hard disk type, a multimedia card micro type, a card type memory, a random access memory (RAM), a static random access memory (SRAM), a read-only memory (ROM), an electrically erasable read-only memory (EEPROM), a programmable read-only memory (PROM), a magnetic memory, a magnetic disk and an optical disk. The memory unit 110 may store the use frequency of each item included in a menu or individual application.

The display unit 120 includes a touch panel and displays menu information through a two-dimensional (2D) or three-dimensional (3D) display. When the display unit 120 includes the 3D display, a 3D cube for the menu information can be displayed. Specifically, in the 3D cube, a single item contained in menu information or application information corresponding to a menu is displayed on a face. For example, a first item may be displayed on a first face, and a second item different from the first item may be displayed on a second face. The touch panel may receive an external signal, such as a user's touch through a touch sensor. The signal may be inputted by converting a change in pressure applied to a surface of the touch panel or a change in capacitance generated at a specific portion of the touch panel into an electrical input signal through a touch sensor. The touch sensor may be in the form of a touch film, a touch sheet, a touch pad, or the like. The touch sensor may sense a touched position, a touched area, and/or touch pressure of the touch, and movement of the touch while maintaining the touch. The signal sensed by the touch sensor is transmitted to a touch controller, and a data obtained by processing the sensed signal in the touch controller is transmitted to the control unit 140. Accordingly, the control unit 140 can determine a position of the display unit 120 at which a signal is inputted, the kind of inputted signal, and the like.

A 3D cube as described herein may correspond to a single rotatable portion of the image displayed on the display unit 120. In this instance, for example, the image shown in the first display screen 210 of FIG. 2 could include five 3D cubes. However, the 3D cube may include multiple rotatable portions of the image displayed on the display unit 120, and so a 3D cube as described herein could include 3D sub-cubes that may rotate independently or collectively with a larger portion of the 3D cube in response to a user input.

The sensing unit 130 may include a proximity sensing unit and/or a motion sensing unit. The proximity sensing unit generates a proximity sensing signal by detecting an object that approaches the touch panel using an electromagnetic force or infrared rays without having mechanical contact. The proximity sensing signal generated by the proximity sensing unit may be generated in the same manner as the touch signal generated in the touch panel. The motion sensing unit senses the rotation of the mobile terminal 100 and may generate a motion sensing signal based on a rotational direction, a rotational angle, a posture of the mobile terminal 100 as the rotation result, and the like. Specifically, the motion sensing unit may generate a sensing signal for rotation of the mobile terminal in the left direction, the rotation of the mobile terminal in the lower direction, or the like. The degree of rotation may be 45 degrees for the motion sensing unit to generate the sensing signal. Thus, the user may cause one or more 3D cubes to be rotated by rotating or tilting the mobile terminal 100.

While the sensing unit 130 has been described as including a proximity sensing unit and/or a motion sensing unit, the sensing unit 130 could include the touch sensor of the display unit 120 instead of or in addition to the proximity sensing unit and/or a motion sensing unit.

The control unit 140 generally controls the operations used in and performed by the mobile terminal 100. For example, the control unit 140 may perform control and processes related to voice telephony, data communication, video conferencing, short message service (SMS) messaging, multimedia message service (MMS) messaging, and the like. The control unit 140 may cause new information to be displayed in a display area of the first item on the display unit 120 based on a signal inputted by a user. Specifically, the display area of the first item of the 3D cube may be rotated, and the second item may be displayed in the rotated display area. Here, the second item is contained in menu information application information corresponding to a menu, positioned in the rotated display area. The first item and second item may be related and both corresponding to a same menu. When a 3D cube is displayed on the display unit 120, the first item positioned on the first face of the 3D cube is rotated and displayed, thereby providing information of the second item positioned on the displayed second face. When the second item displayed on the second face of the 3D cube is an executable application, the executable application may be set to be directly executed when the first item is rotated. For example, when a drag or motion signal in the left/right direction is sensed based on the drag signal through the touch panel or sensing unit 130 and the motion sensing signal of the sensing unit 130, the second item positioned in another display area displayed on the front face is displayed or executed while rotating the display area of the first item in a direction of the user input.

In this case, the relationship between the first and second items may be predetermined. For example, when the first item corresponds to a main menu, the second item may be another main menu having a selective relationship with the main menu or a sub-menu having a hierarchical relationship with the main menu. When the memory unit 110 stores the use frequency for each item, the control unit 140 may control a menu with a higher use frequency or each item for an application to be displayed in a position reserved for the higher use frequency menus or items according to the use frequency.

The control unit 140 may provide various animation effects to the display area of the first item in the displayed 3D cube. For example, the control unit 140 may provide a zoom-in or zoom-out effect to the display area of the first item in the 3D cube, so that a first area displayed on the front face is enlarged and displayed through the zoom-in effect, thereby overcoming the limitation of a screen size. The control unit 140 may display various pieces of additional information together with the first item. For example, the control unit 140 may display an arrow-indicating icon that indicates a direction in which the first display area in the 3D cube can be rotated. Specifically, when a 3D cube is displayed, an arrow-indicating icon that indicates the right direction may be displayed when the 3D cube can be rotated in only the right direction, and arrow-indicating icons that respectively indicate the left and right directions may be displayed when the 3D cube can be rotated in both of the left and right directions.

Figure 2:
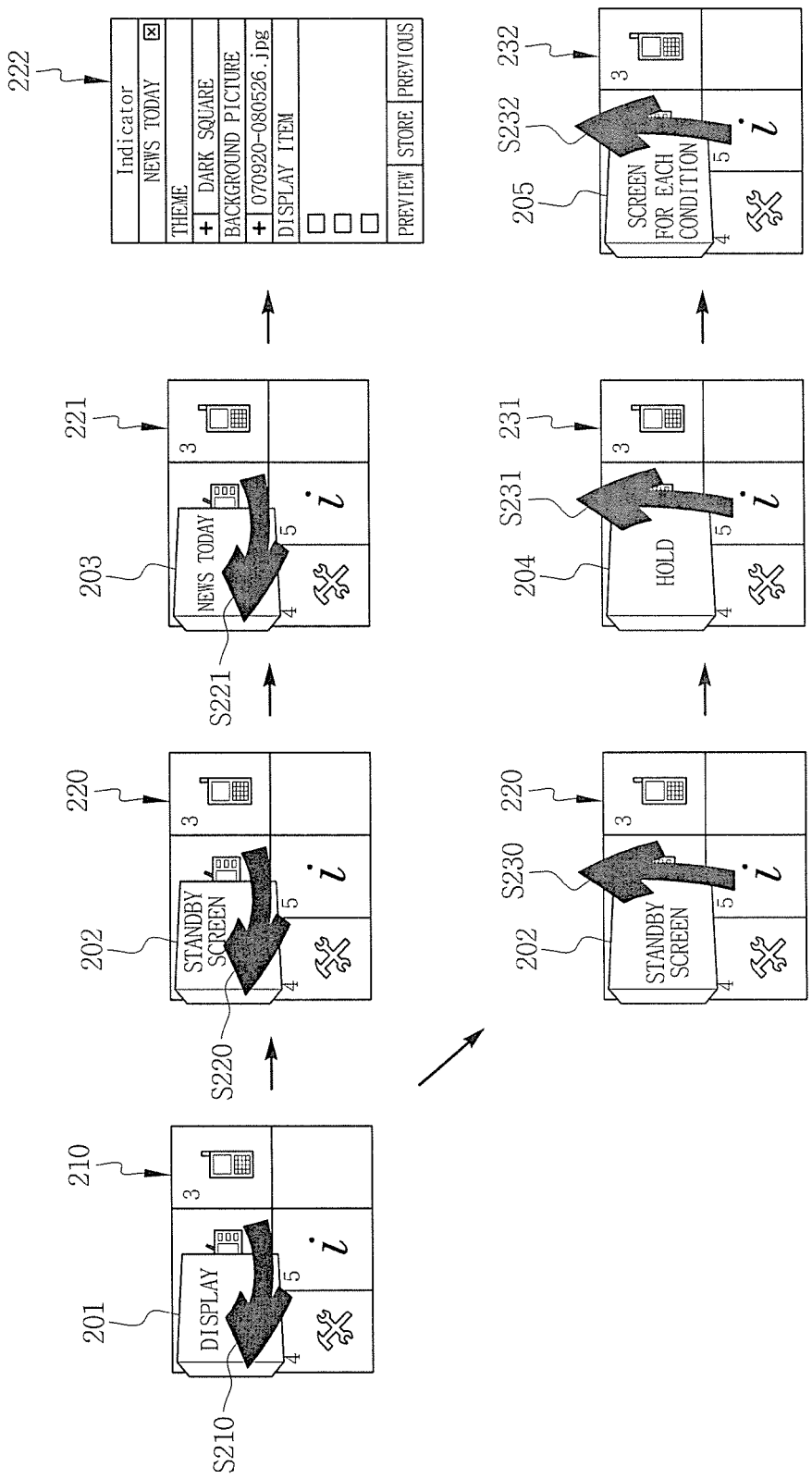
FIG. 2 is a view showing a mobile terminal that displays a three-dimensional (3D) cube for menu screens according to an exemplary embodiment.

FIG. 2 is a view showing a mobile terminal that displays a 3D cube for menu screens according to an exemplary embodiment.

Referring to FIG. 2, a 3D cube is displayed on the display unit 120 of the mobile terminal. Here, the 3D cube displays one or more main menus, one or more sub-menus included in each of the main menu, one or more items included in each of the sub-menus, and the like. The main menu, the sub-menu and the item have hierarchical relationships with one another. In the 3D cube of FIG. 2, a menu includes a main menu "Display" and the like, the main menu "Display" includes sub-menus including "(1) Standby screen," "(2) Hold," "(3) Screen for each condition," "(4) Menu type" (not shown) and the like, and the sub-menu "(1) Standby screen" includes items including "(1) Self design," (not shown) "(2) News today" and the like. Here, the main menu, the sub-menus and the items are displayed on the respective faces of the 3D cube. In the embodiment, menu information set to have a hierarchical relationship is displayed when the 3D cube is rotated in the left/right direction, and menu information having a horizontal relationship, such as the sub-menus of the "Display" main menu, is displayed when the 3D cube is rotated in upper/lower direction. First, the main menu "Display" is displayed on a first face 201 of a 3D cube displayed in a first display screen 210. In a second display screen 220 obtained by inputting a drag signal in the left direction to the 3D cube (S210), the 3D cube is rotated in the left direction, so that the item "Standby screen" that is a first sub-menu of the main menu "Display" is displayed on a second face 202 of the 3D cube. Continuously, in a third display screen 221 obtained by inputting a drag signal in the left direction to the 3D cube (S220), the 3D cube is rotated in the left direction, so that the item "News today" that is an item of the sub-menu "Standby screen" is displayed on a third face 203 of the 3D cube. Continuously, an application of the item "News today" is executed and displayed in a fourth display screen 222 by inputting a drag signal in the left direction to the 3D cube (S221).

If a drag signal in the upper direction is inputted to the second display screen 220 (S230), the item "Hold" that is a second sub-menu of the main menu "Display" is displayed on a fourth face 204 of the 3D cube in a fifth display screen 231. Similarly, in a sixth display screen 232 obtained by inputting a drag signal in the upper direction to the 3D cube (S231), the item "Screen for each condition" that is a third sub-menu of the main menu "Display" is displayed on a fifth face 205 of the 3D cube. Further sub-menus, such as "(4) Menu type" (not shown), of the main menu "Display" can be viewed by inputting a drag signal in the upper/lower direction to the fifth face 205 of the sixth display screen 232 (S232). Thus, a user can select a desired application or cycle through available menus and sub-menus by inputting a drag signal in the upper/lower (S232 for example) or left/right direction (S220 for example) so as to find and execute an application. When multiple sub-menus below one main menu exist, more frequently used sub-menus may be displayed earlier in response to drag signals to the main menu, in the order that reflects the use frequency stored in the memory unit 110. An icon that indicates a direction in which the 3D cube can be rotated may also be displayed.

Although not shown, there may be a region on the display whereby a user may rotate more than one 3D cube collectively through a single input, such as a single touch or swipe or drag.

Figure 3:
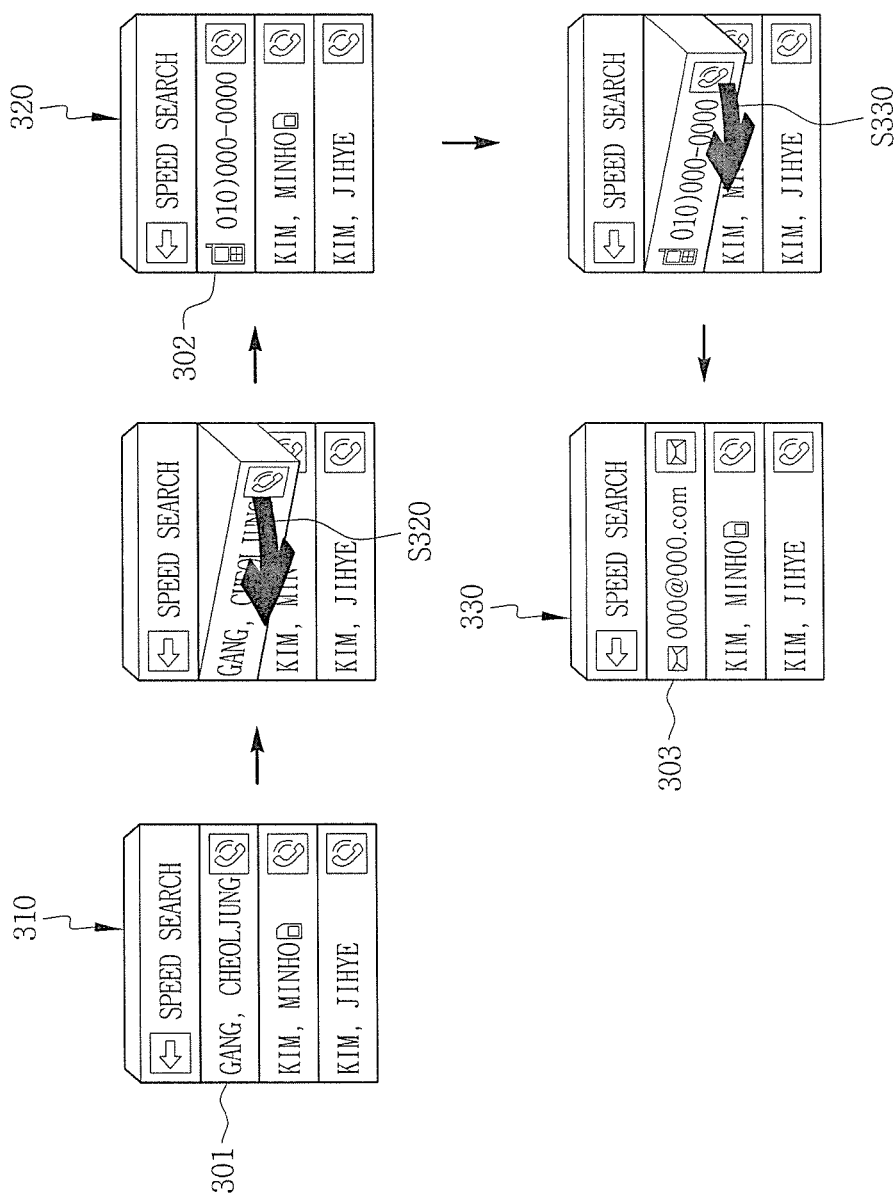
FIG. 3 is a view showing a mobile terminal that displays a 3D cube for a phone book according to an exemplary embodiment.

FIG. 3 is a view showing a mobile terminal that displays a 3D cube for a phone book according to an exemplary embodiment.

Referring to FIG. 3, the mobile terminal according to the embodiment displays 3D cubes in which detail information of a phone book is displayed. "Gang, cheoljung" and the like, which are one or more items of the phone book are displayed in a first display screen 310, and each of the items forms a 3D cube. In a second display screen 320 obtained by rotating a 3D cube having the item "Gang, cheoljung" displayed on a first face 301 thereof in the left direction (S320), a telephone number ("010)000-0000") that is a first detail item for the item "Gang, cheoljung" is displayed on a second face 302 of the 3D cube. In a third display screen 330 obtained by rotating the 3D cube in the left direction (S330), an e-mail address ("000@000.com") that is a second detail item for the item "Gang, cheoljung" is displayed on a third face 303 of the 3D cube.

Figure 4:
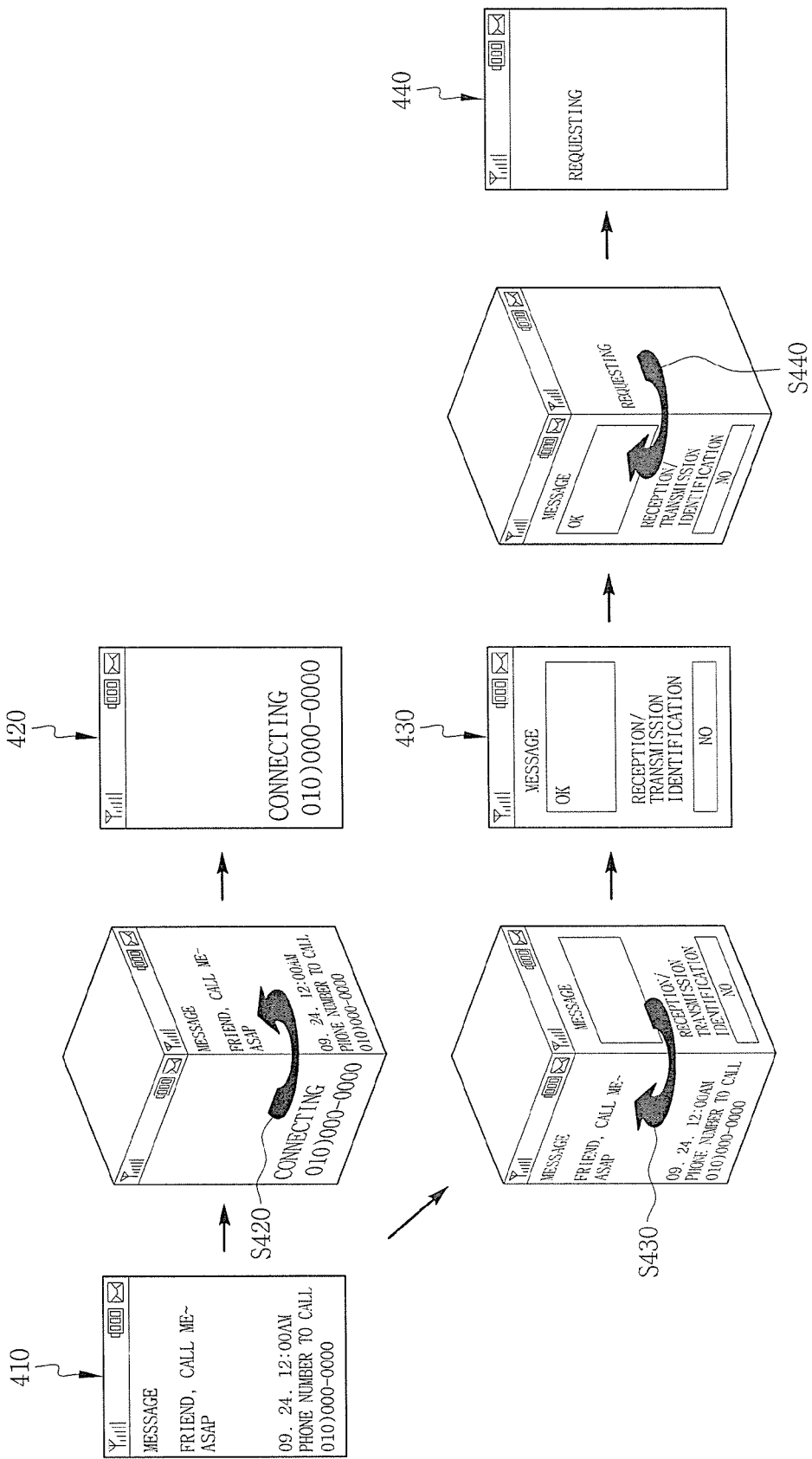
FIG. 4 is a view showing a mobile terminal that displays a 3D cube for a message application according to an exemplary embodiment.

FIG. 4 is a view showing a mobile terminal that displays a 3D cube for a message application according to an exemplary embodiment.

Referring to FIG. 4, the mobile terminal displays a 3D cube in which various applications for a reception message are displayed on a display unit 120. A message received from another terminal is displayed in a first display screen 410. Application information on transmission of a call to the other terminal is displayed in a second display screen 420 obtained by rotating the first display screen 410 in the right direction (S420), and the application may be automatically executed according to a user's settings or a default setting. Application information to reply to the received message with a text or multimedia message is displayed in a third display screen 430 obtained by rotating the first display screen 410 in the left direction (S430). After a message is written in the third display screen 430, application information on transmission of the reply message is displayed in a fourth display screen 440 obtained by rotating the third display screen 430 in the right direction (S440), and the application may be automatically executed according to settings.

Figure 5:
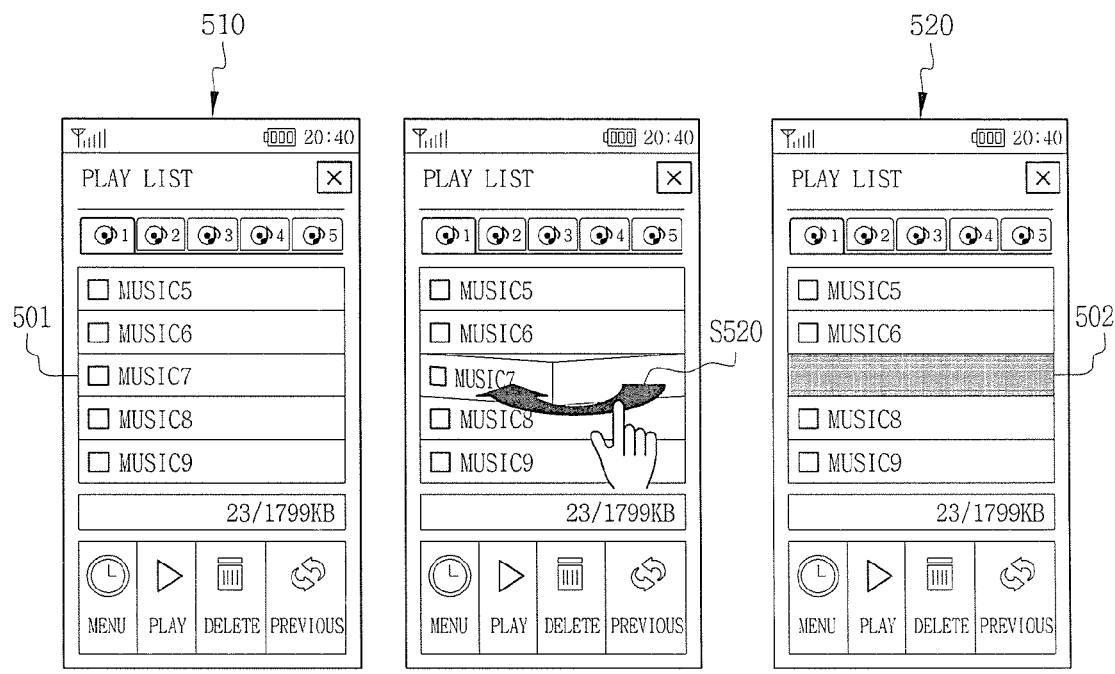
FIG. 5 is a view showing a mobile terminal that displays a 3D cube for a multimedia application according to an exemplary embodiment.

FIG. 5 is a view showing a mobile terminal that displays a 3D cube for a multimedia application according to an exemplary embodiment.

Referring to FIG. 5, the mobile terminal displays 3D cubes in which various applications for playing multimedia files are displayed. "Music 5," "Music 6," "Music 7" and the like, which are one or more multimedia file items displayed in a first display screen 510, and the items are a face of a 3D cube. In a second display screen 520 obtained by rotating a 3D cube having the multimedia file "Music 7" displayed on a first face 501 thereof in the left direction (S520), the multimedia file "Music 7" is deleted from a play list as one of selective applications for the multimedia files, and a vacant slot 502 is shown in place of "Music 7" in the second display screen. In the selective application, various applications such as play, fast wind, rewind, pause and delete may be executed according to applications.

In addition, various pieces of information displayed in the mobile terminal, such as alarm and schedule, may be displayed on a first face of a 3D cube, so that detail information or application information on the information can be displayed while rotating the 3D cube.

Figure 6:
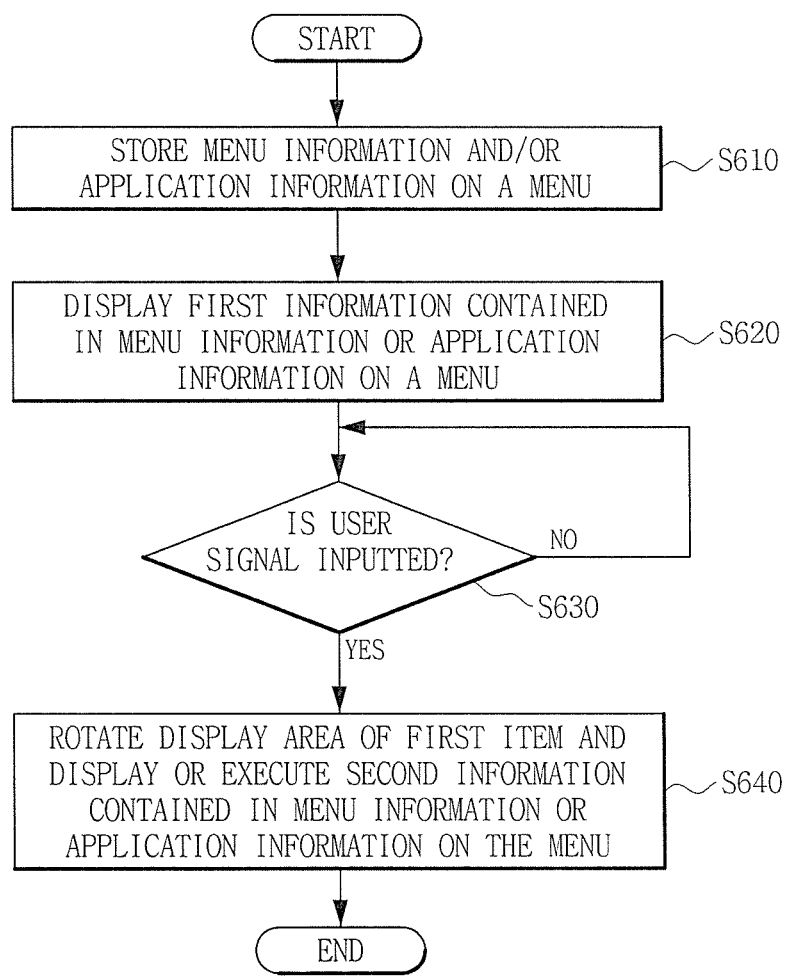
FIG. 6 is a flowchart illustrating a method for displaying information.

FIG. 6 is a flowchart illustrating a method for displaying information. FIG. 6 will be described as if the method is being performed using the mobile terminal shown in FIG. 1. However, the scope of the method is not limited thereto.

Referring to FIG. 6, menu information and/or application information on one or more menus are stored (S610), and a first item contained in the menu information or the application information on a menu is displayed (S620). If a user signal is inputted to the mobile terminal (S630), a display area of the first item is rotated, thereby displaying or executing a second item contained in the menu information or the application information (S640). The second item may be related the first item, such as the first item may be a menu and the second item may be a sub-menu or application under the first item.

The menu information or the application information corresponding to a menu may be displayed on a face of a 3D cube, and the user signal may include a touch or drag signal. A rotation sensing signal that senses the rotation of the mobile terminal may be included in the input signal, and the second item may be displayed or executed while rotating the display area of the first item based on the rotation sensing signal. The direction of the input signal may be sensed, and the second item having a predetermined relationship with the first item contained in the menu information and the application information corresponding to each menu may be displayed or executed while rotating the display area of the first item in the direction of the user signal.

The mobile terminal and the method for displaying information, described above, are not limited to the configurations and methods of the aforementioned embodiments, and may be configured by selectively combining the whole or some of the respective embodiments.

As described above, in the mobile terminal according to an exemplary embodiment or a combination of exemplary embodiments, various pieces of information can be identified, and the conversion of a function or change of a setup state can be performed in the touch user interface environment.

While the disclosure has been described in connection with certain exemplary embodiments, it is to be understood that the invention is not limited to the disclosed embodiments, but, on the contrary, is intended to cover various modifications, variations, and equivalent arrangements included within the spirit and scope of the appended claims and their equivalents.

What is claimed is:

1. A mobile terminal, comprising:
   a memory unit to store menu information and application information corresponding to a first menu;
   a display unit comprising a touch panel, the display unit to display a first item contained in the menu information or the application information corresponding to the first menu in the memory unit; and
   a control unit to rotate a display area of the first item and to control the display unit to display a second item contained in the menu information or the application information corresponding to the first menu in the memory unit,
   wherein the control unit rotates the display area of the first item while rotating a display area of the second item and executes the second item according to the rotation.

2. The mobile terminal according to claim 1, wherein the first item is displayed on a first face of a three-dimensional (3D) cube, and the control unit controls the second item to be displayed on a second face of the 3D cube by rotating the 3D cube.

3. The mobile terminal according to claim 1, wherein the display area is rotated in response to a user signal, the user signal comprising a touch or drag signal.

4. The mobile terminal according to claim 1, further comprising a sensing unit to sense movement of the mobile terminal and to generate a rotation sensing signal according to the movement,
   wherein the control unit controls the display area of the first item to be rotated based on the rotation sensing signal, and controls the second item contained in the menu information or the application information to be displayed.

5. The mobile terminal according to claim 1, further comprising a sensing unit to sense an object that approaches the mobile terminal and to generate a proximity sensing signal,
   wherein the control unit controls the display area of the first item to be rotated based on the proximity sensing signal, and controls the second item contained in the menu information or the application information to be displayed.

6. The mobile terminal according to claim 1, wherein the control unit controls the display area of the first item to be rotated in a direction corresponding to a user signal, and controls the second item having a relationship with the first item to be displayed.

7. The mobile terminal according to claim 1, wherein:
   the memory unit stores use frequency for each item included in the menu information corresponding to the first menu; and
   the control unit controls the display area of the first item to be rotated, and controls the second item to be displayed in an order that reflects the use frequency stored in the memory unit, the second item being second in the order.

8. The mobile terminal according to claim 1, wherein the control unit controls an animation effect to be provided to the display area of the first item.

9. The mobile terminal according to claim 1, wherein an icon is displayed to indicate a rotation direction of the first item.

10. The mobile terminal according to claim 1, wherein the control unit controls the display unit to display the first item of a phone book on a first face of a 3D cube, and controls a detail item of the first item of the phone book to be displayed on a second face of the 3D cube by rotating the 3D cube based on a touch or drag signal.

11. The mobile terminal according to claim 1, wherein the control unit controls the display unit to display the first item of a message application on a first face of a 3D cube, and controls a call or message transmission/reception application displayed on a second face of the 3D cube to be executed by rotating the 3D cube based on a touch or drag signal.

12. The mobile terminal according to claim 1, wherein the control unit controls the display unit to display the first item of a multimedia application on a first face of a 3D cube, and controls a selective application for the multimedia application displayed on a second face of the 3D cube to be executed by rotating the 3D cube based on a touch or drag signal.

13. A method for displaying information, comprising:
storing menu information and application information corresponding to a first menu;
displaying on a display unit a first item contained in the menu information or the application information corresponding to the first menu;
receiving a user signal; and
rotating a display area of the first item and controlling a second item contained in the menu information or the application information corresponding to the first menu to be displayed at the display area or executed based on the inputted user signal,
wherein the rotating rotates the display area of the first item while rotating a display area of the second item based and executes the second item according to the rotation.

14. The method according to claim 13, wherein:
displaying the first item comprises displaying the first item on a first face of a 3D cube; and
controlling the second item to be displayed comprises controlling the 3D cube to be rotated and controlling the second item displayed on a second face of the 3D cube.

15. The method according to claim 13, wherein receiving the user signal comprises receiving a touch or drag signal.

16. The method according to claim 13, wherein:
the input signal comprises a rotation sensing signal that senses rotation of a mobile terminal; and
the method further comprises controlling the display area of the first item to be rotated based on the rotation sensing signal and controlling the second item to be displayed.

17. The method according to claim 13, wherein rotating the display area of the first item comprises rotating the display area of the first item in a first direction of the user signal and controlling the second item having a predetermined relationship with the first item contained in the menu information or the application information to be displayed.

18. A mobile terminal, comprising:
a memory unit to store first menu information corresponding to a first menu and second menu information corresponding to a second menu;
a display unit comprising a touch panel, the display unit to display a first item contained in the first menu information corresponding to the first menu; and
a control unit to rotate a display area of the first item and to control the display unit to display a second item,
wherein the second item is contained in the first menu information or the second menu information and the control unit rotates the display area of the first item while rotating a display area of the second item and executes the second item according to the rotation.

19. The mobile terminal of claim 18, wherein if a user input is applied to the display area of the first item in a first direction, the second item is retrieved from the first menu information, and if the user input is applied to the display area of the first item in a second direction, the second item is retrieved from the second menu information.

20. The mobile terminal of claim 18, wherein the first item is a main menu and the second item is a sub-menu hierarchically arranged below the main menu.

21. The mobile terminal of claim 18, wherein the first item is a menu and the second item is an application to be executed automatically or upon a user's input.

* * * * *